Aug. 26, 1952          P. L. LAW          2,608,348
REGISTERING ARRANGEMENT FOR ARTICLE DISPENSING SYSTEMS
Filed Aug. 18, 1949          9 Sheets-Sheet 1

Inventor
Peter L. Law
By Ward Crosby & Neal
Attorneys

Inventor
Peter L. Law.
By Ward Crosby & Neal.
Attorneys

Aug. 26, 1952     P. L. LAW     2,608,348
REGISTERING ARRANGEMENT FOR ARTICLE DISPENSING SYSTEMS
Filed Aug. 18, 1949     9 Sheets-Sheet 9

*Inventor*
*Peter L. Law*
By *Ward Crosby Sheal.*
*Attorneys*

Patented Aug. 26, 1952

2,608,348

UNITED STATES PATENT OFFICE 2,608,348

REGISTERING ARRANGEMENT FOR ARTICLE DISPENSING SYSTEMS

Peter Lincoln Law, Roseville, near Sydney, New South Wales, Australia, assignor to Communication Engineering Pty. Limited, Cammeray, near Sydney, State of New South Wales, Australia, a corporation of Australian Capital Territory Application August 18, 1949, Serial No. 110,979
In Australia August 30, 1948

18 Claims. (Cl. 235—92)

The invention relates to recording arrangements in article dispensing systems and in particular to arrangements for the recording of the values and/or other classifications assigned to articles dispensed in such systems.

It has been proposed to provide article dispensing systems with recording arrangements to record for example by visual indications the price or coupon value of selected articles when these articles are discharged from their respective shelves by the operation of keys over electrical circuits. To enable a customer to check the amount spent during the selection of his batch or order these indicators show progressively the added up prices of the selected articles.

In systems of this kind circuit arrangements are provided which are marked automatically corresponding to the price of an article whenever the article is selected from its respective shelf. These markings are then transferred to an adding arrangement which adds the price of this article to the prices of the foregoing articles of the same order, and at a lamp indicator indicates progressively the amount of money spent so far.

The speed with which articles can be keyed up on the keyboard for selection depends largely on the time that is necessary to transfer the marking for an article to the adding arrangements to add up the prices of the selected articles, and quite a considerable time is lost in setting up the price indicator for the progressive amounts, thus reducing the efficiency of the article dispensing system.

This difficulty is overcome according to the invention by the provision of a plurality of counting devices, so arranged that the first free counting device picks up the marking of a selected article. This counting device locks itself and at the same time prepares the circuit for the next free counting device so that the next selected article marks the next counting device.

While several counting devices are marked up by selected articles, the markings set up on the counting devices are one after the other transferred to the adding device, and this transfer from counting devices to the adding device proceeds while other articles are keyed up on the keyboard.

It is another feature of the invention to provide separate counting devices for each denomination which might occur in the value of a single article.

It is a further feature of the invention to provide the adding device with arrangements to transfer the recording in a lower denomination to a recording in a higher denomination when the added up values of one order reach the value of this higher denomination.

According to a further feature of the invention the adding device comprises an adding switch for a lower denomination which stores the value of the higher denomination in a relay device when this switch reaches this higher value and an adding switch for this higher denomination is busy, and said adding switch for the lower denomination then continues to add up values in said lower denomination.

It is still a further feature of the invention to provide the counting devices and the adding device with rotary switches, so arranged that a counting device is only free for further counting when the counting switch and the adding switch have stepped up the same number of steps.

It is another feature of the invention to connect the adding device with a lamp indicator showing the progressive value of one order, and to provide circuits to switch off said lamp indicator during stepping-up operations of said adding device, and to switch said lamp indicator on again when said adding device has reached its final value.

According to another feature of the invention, the adding device is connected with a totalling device to transfer the added-up value for one order from the adding device to a registering arrangement to register the total value of articles keyed up on the keyboard during a certain time period.

It is still another feature of the invention to provide means to transfer the value indication from the adding device to the totalling device depending on the completion of an order consisting of one or a plurality of articles.

It is still a further feature of the invention to make arrangements so that the adding switches are only freed for the next order when the switches of the totalling device have stepped up the same number of steps as the adding switches.

According to another feature of the invention, the registering arrangements are provided with message registers to register the total value turned over by the article dispensing system, said message registers having contacts to control the re-setting of the switches of the totalling device.

It is a further feature of the invention to provide means to register separately the value of orders sold by each individual salesman, and to control simultaneously the transfer of the added-up value of each order from the adding device to the totalling device and the registering arrangement.

It is still a further feature of the invention to provide counting devices, an adding device and a totalling device for a plurality of indications characteristic for each selected article, e. g., to provide separate arrangements for the recording of the prices and the coupon values respectively of each kind of article.

These and further features of the invention will be more fully understood from the following description in connection with the drawings showing one embodiment of the invention.

Figure 7:
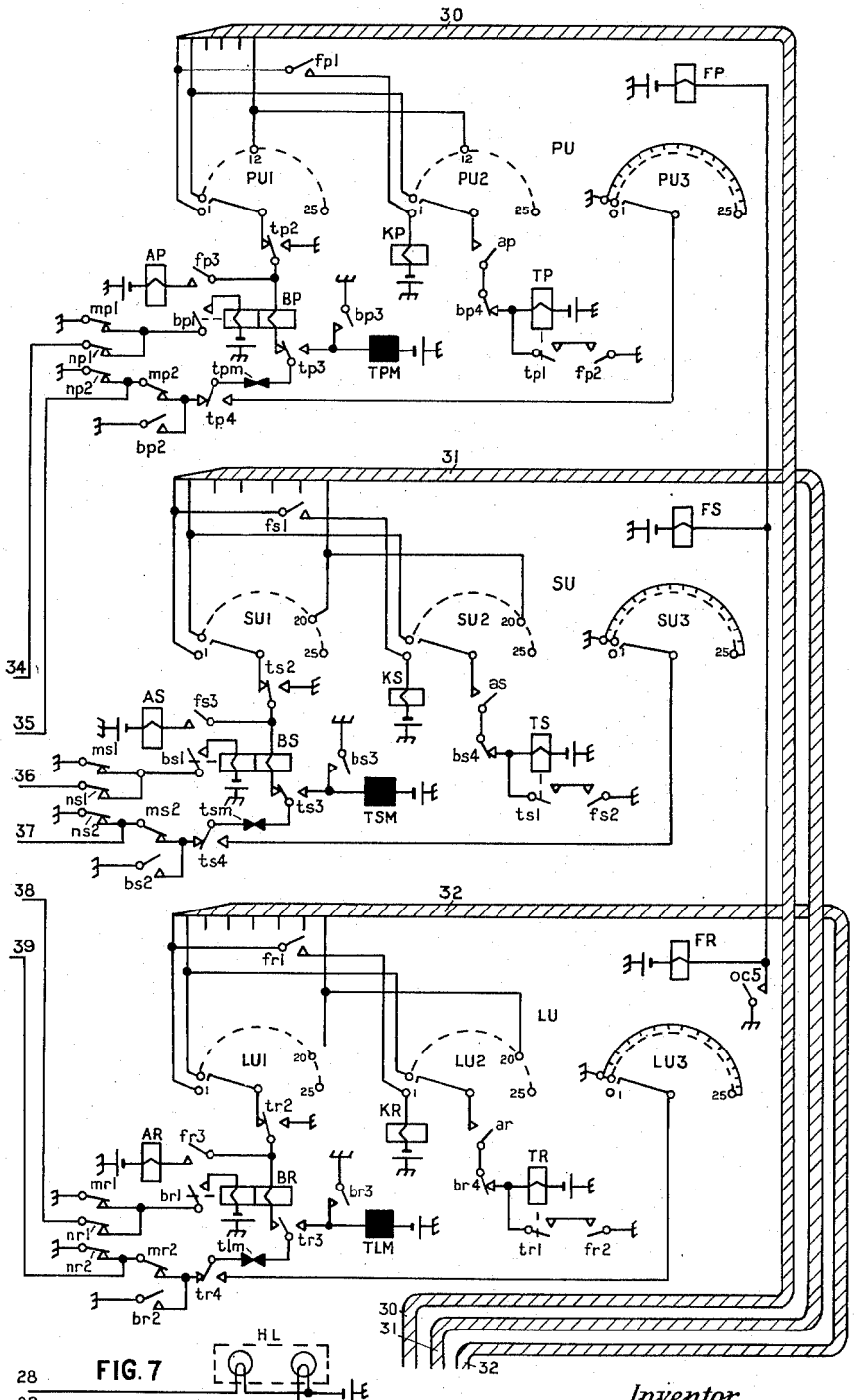

Fig. 7 gives the circuits and switches for the totalling device.

Figure 8:
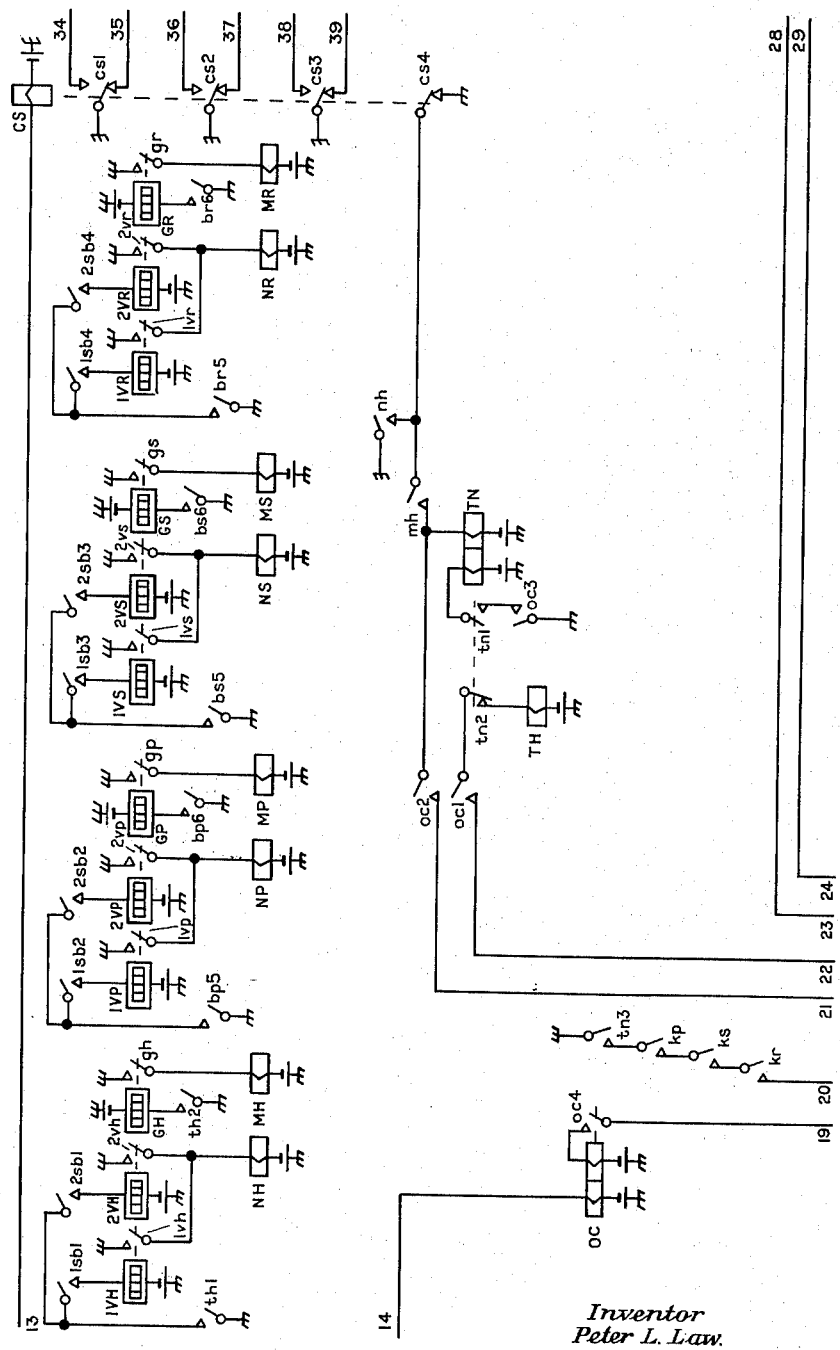

Fig. 8 shows schematically message registers to indicate the total amount turned over in the dispensing system as well as the amounts turned over by various salesmen.

Figure 9:
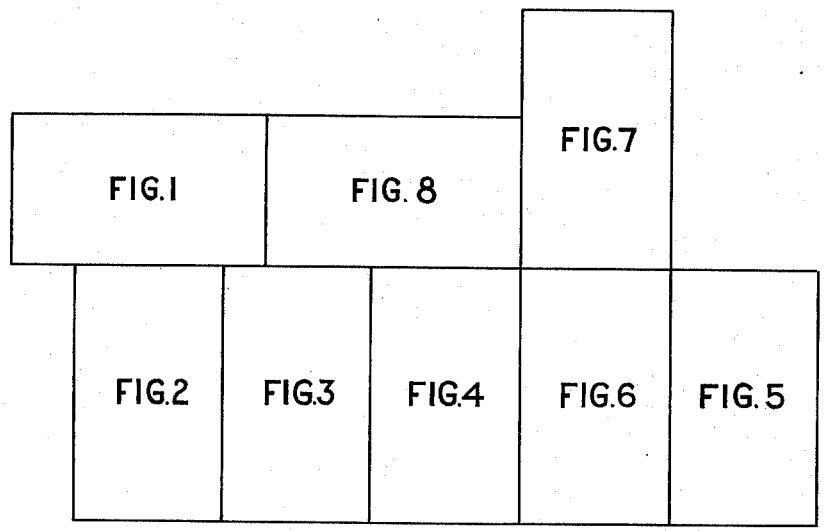

Figure 9 shows a composite arrangement of Figures 1 to 8, which gives a properly connected complete wiring diagram of the invention.

In the drawings the relays and their contacts are shown in accordance with the detached contact method whereby the contacts are not necessarily shown next to their corresponding relays but at the place where they are used in the circuit, thus simplifying the circuit diagram. The relays are marked with capital letters and corresponding contacts are marked with the same small letters and an additional figure distinguishing the various contacts of the same relay.

Figure 1:
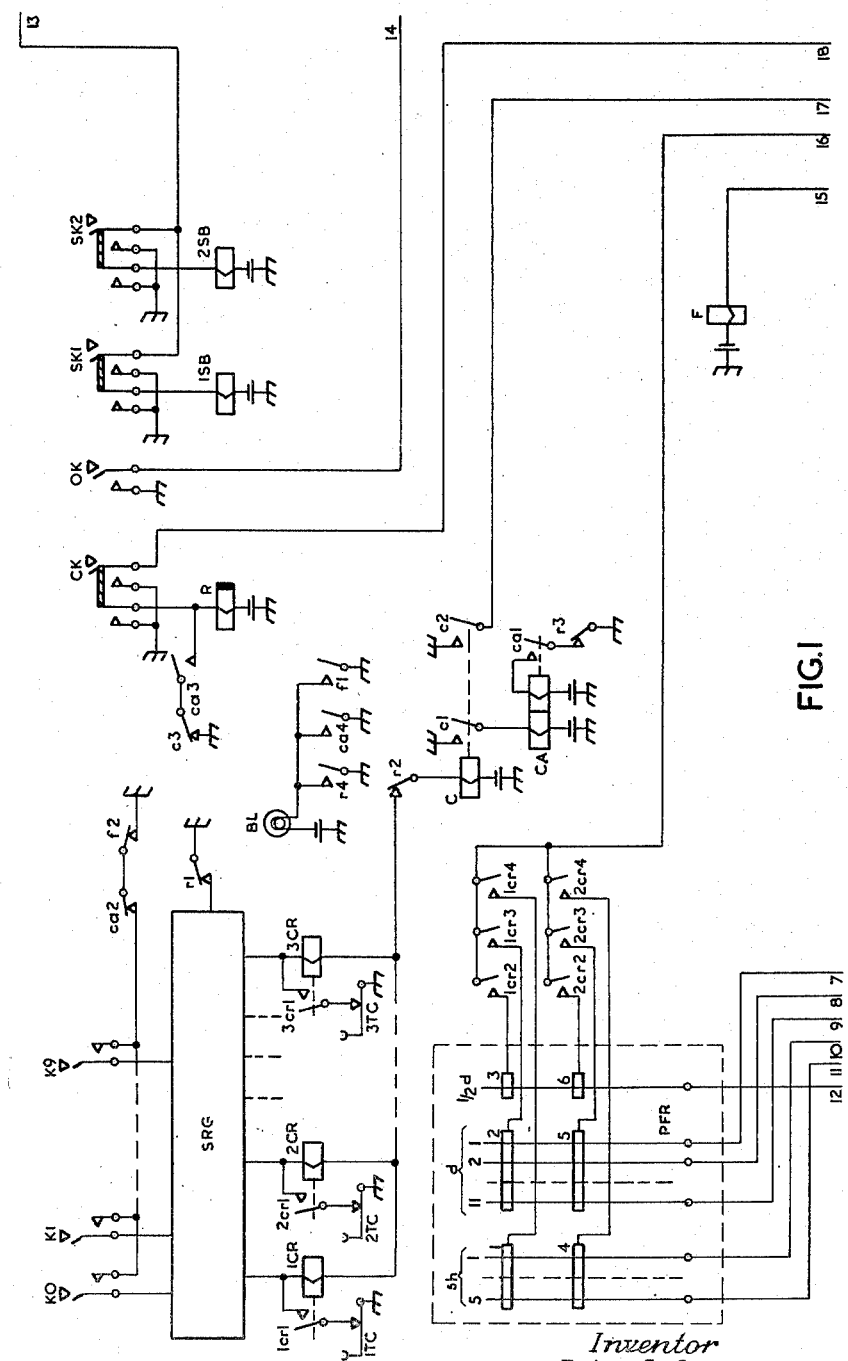
Fig. 1 shows schematically the operator's position of an article dispensing system together with the selecting relay group and the pricing frame.

In Fig. 1 the operator's position consists of a row of ten keys K0 to K9 which are used to key up the various digits of a code number designating a particular kind of article. It must be understood, however, that a separate key for each kind of article can be provided without altering the pricing arrangement described later on.

The operator's position furthermore comprises a "cancel" key CK which is operated whenever a key was wrongly pressed or when a bin has been empty to energise the relay R and thus to restore all the circuits back to normal. An "order complete" key OK is operated whenever all items belonging to one order have been selected by the row of keys K0 to K9.

To enable a recording of the amounts turned over by different salesmen additional salesmen keys SK1 and SK2 with the relays 1SB and 2SB are operated while an order is keyed up by the operator on the keys K0 to K9.

The number of salesmen keys is not limited and depends solely on the number of salesmen employed at the shop.

The operator's position contains furthermore a "busy" lamp BL which gives an indication to the operator when he can continue with the keying up of another item and when he has to wait until the circuits are free for the next selection.

As a selection of articles itself is not part of the present invention the selecting relay group SRG is only schematically indicated. Only those relays are shown which are necessary to give a clear understanding of the operation of the recording arrangements. A selecting relay group, which can be used in this connection, is, for example, described in my co-pending application Serial No. 110,149 filed August 13, 1949, for Improvements in Selection Circuit.

Whenever an article is to be selected the digits corresponding to its code number are keyed up by pressing the corresponding keys and circuits are established from earth via contact f2, contact ca2, one of the keys K0 to K9 to the selecting relay group SRG. The selecting relay group SRG operates various relays over earth provided via contact r1 and finally operates one of the clutch relays 1CR to 3CR over contact r2, relay C to battery. The number of CR relays is solely dependent on the number of various kinds of articles which have to be stored and dispensed and has no relation to the number of keys used for the selection in case the selection of articles is performed by keying up the digits of their respective stock numbers.

When operated the clutch relays 1CR to 3CR can lock themselves up over their contacts 1cr1 to 3cr1 and their corresponding trip contacts 1TC to 3TC. The CR relays at the same time operate their other contacts for example 1cr2, 1cr3, 1cr4 of relay 1CR or the corresponding contacts of the other CR relays to put earth on to a pricing frame PFR to mark the price of a selected kind of article.

The C relay, operated in series with one of the clutch relays CR, energises over contact c1 the CA relay which in turn prepares a circuit over contact ca3 for the final release of the circuits and lights the busy lamp BL over its contact ca4 indicating that a selection is in progress. The release of the circuits is performed by a slow-release relay R which removes earth from the selecting relay group SRG at contact r1 and while operating keeps the busy lamp BL alight via its contact r4. The release itself is initiated by the discharge of an article from its corresponding bin and the temporary interruption of the trip lever contact TC by the selected article, which releases the CR relay and the C relay thus closing the circuit for relay R over the contacts c3 and ca3.

The pricing frame PFR which is shown in Fig. 1 only schematically consists of a number of vertical bars whereby for example one bar is provided for half-pennies, eleven bars for the values from one to eleven pennies and five bars for the values of one to five shillings. Horizontal bars passing over and insulated from the shilling bars, the penny bars and the half-penny bars respectively are provided for and connected with one of the three contacts for each clutch relay CR as indicated in Fig. 1 by the bars 1, 2 and 3 connected with the contacts 1cr4, 1cr3, 1cr2 or relay 1CR and the bars 4, 5 and 6 connected with the contacts 2cr4, 2cr3, 2cr2 respectively of the clutch relay 2CR. To mark a price of an article on the pricing frame an electrical connection is made between the bars 1, 2 and 3 and one of the vertical price bars passing underneath them. In the same way the price for the second article is marked by a connection between the price bars and the horizontal bars 4, 5 and 6 as for example described in full detail in Owen-McGibbon-Law application Serial No. 89,878 filed April 27, 1949, for Pricing Frame for Article Dispensing Systems.

Figure 2:
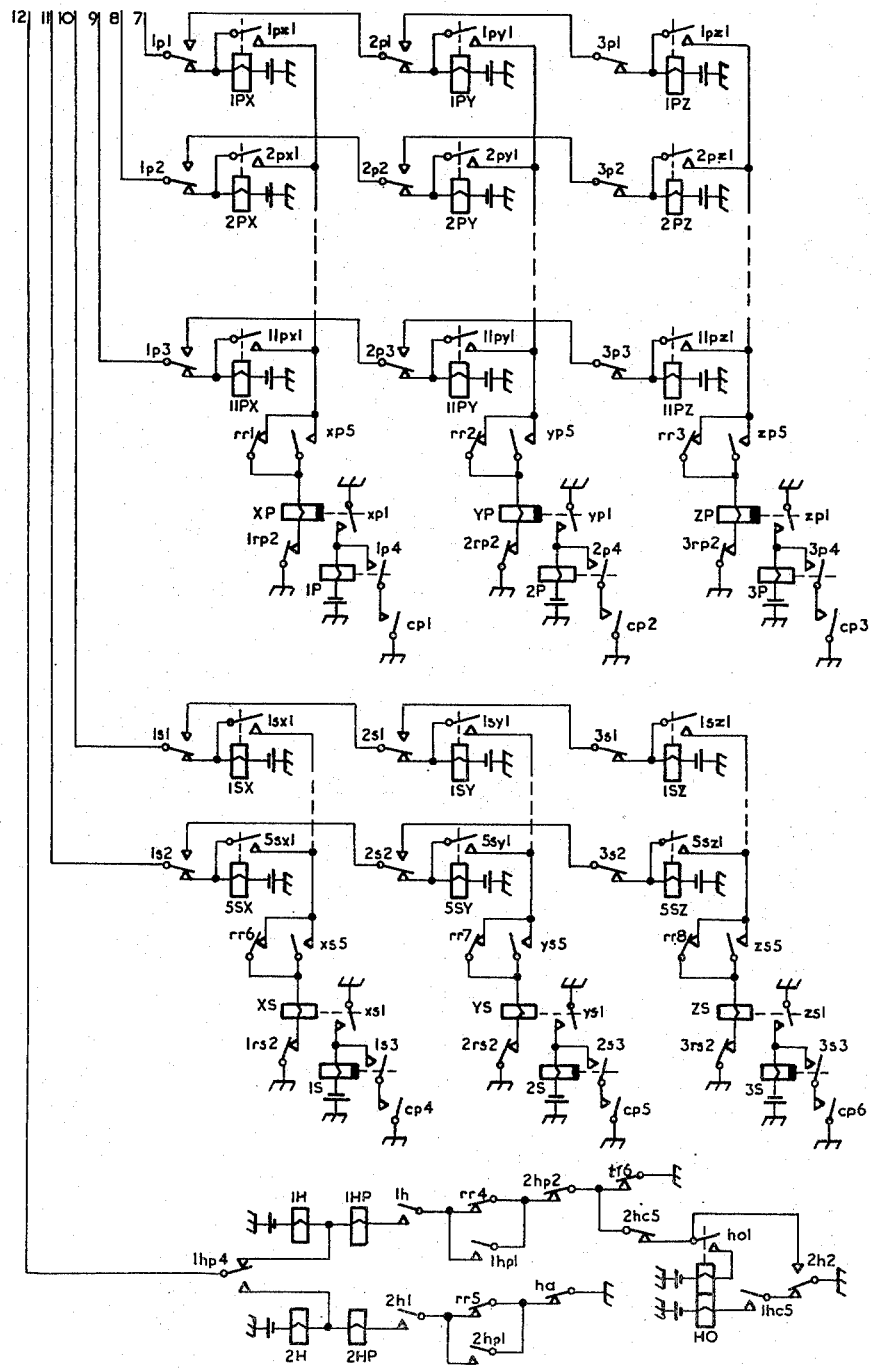
Figs. 2 and 3 show the relay circuits for the counting devices.
Figure 3:
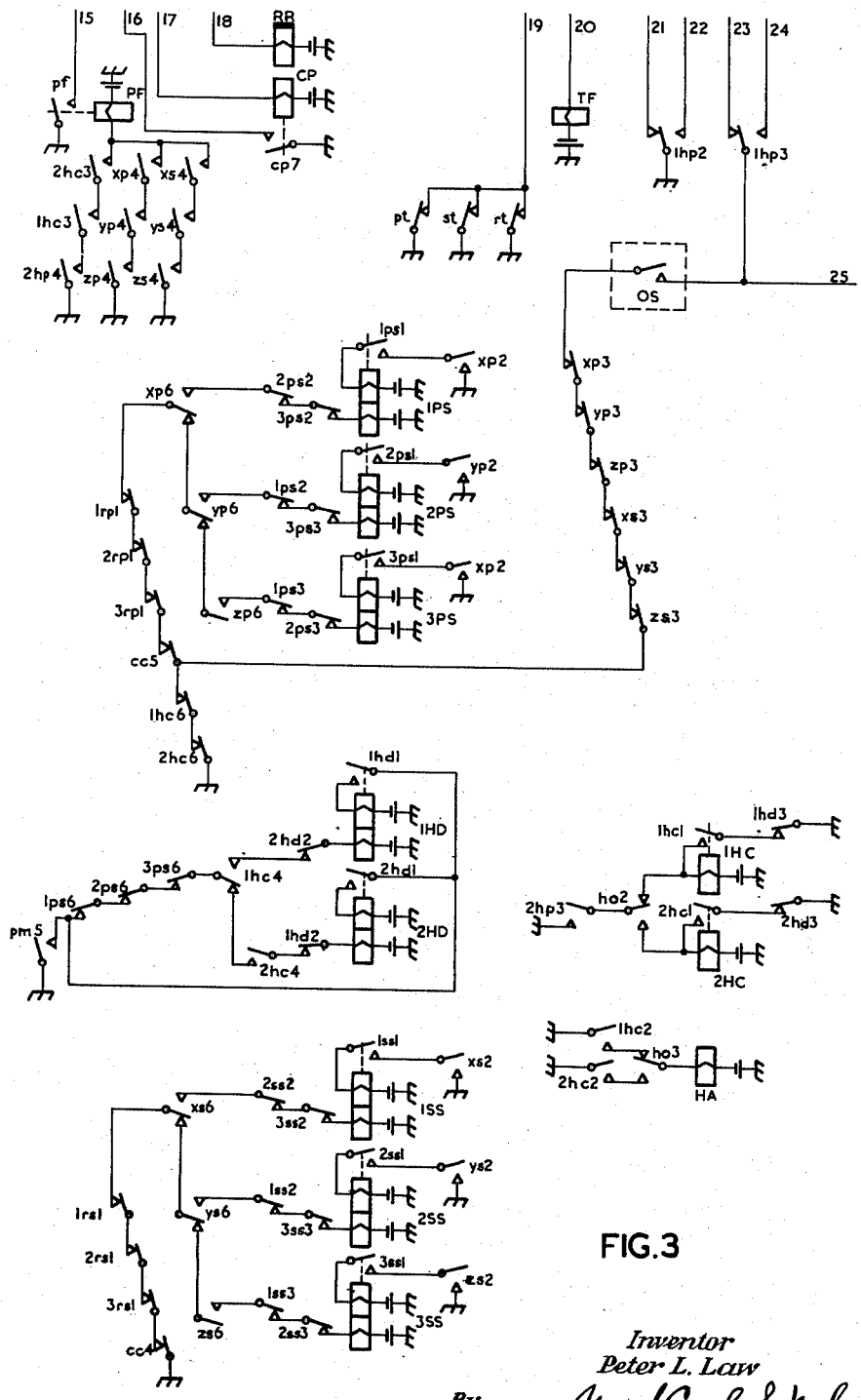

The price bars of the pricing frame PFR corresponding with the various denominations are connected via the leads 7, 8, 9, 10, 11 and 12 with the relay contacts of the price storage groups shown in Figs. 2 and 3.

Three price storage groups for pennies and shillings are shown in the example given, but any other number of storage groups can be provided if necessary. The penny storage groups cooperate with the penny counting switches shown in Fig. 4 and the shilling storage groups cooperate with the shilling counting switches shown in Fig. 5 thus enabling a quicker selection of articles, as price indications are stored in the storage groups and subsequently transferred to the counting switches and the adding switches.

In Fig. 2 the storage relay circuits for only three penny values (1d, 2d and 11d) and two shilling values (1/– and 5/–) are shown, the circuits for the other values in between being exactly the same.

The penny storage groups consist of the relays 1PX, 2PX, 11PX, 1PY, 2PY, 11PY and 1PZ, 2PZ, 11PZ and the shilling storage groups comprise the relays 1SX, 5SX, 1SY, 5SY and 1SZ, 5SZ. Contacts 1px2 to 11px2, 1py2 to 11py2 and 1pz2 to 11pz2 (Fig. 4) mark a position on the penny counting switches with the banks 1PC1, 1PC2, 1PC3; 2PC1, 2PC2, 2PC3 and 3PC1, 3PC2, 3PC3 respectively. Accordingly contacts 1sx2 to 5sx2, 1sy2 to 5sy2 and 1sz2 to 5sz2 (Fig. 5) mark a position on the shilling counting switches with the banks 1SC1, 1SC2, 1SC3; 2SC1, 2SC2, 2SC3 and 3SC1, 3SC2, 3SC3 respectively.

The selection of a particular price storage group to be counted is performed by the relays 1PS, 2PS and 3PS respectively for the penny storage groups and by the relays 1SS, 2SS or 3SS for the shilling storage groups.

When a contact is marked on the bank of a counting switch by a penny or shilling relay as mentioned before, the corresponding switch is stepped up until the wiper reaches the marked contact and at the same time adding switches PA for pennies and SA for shillings (Fig. 6) are stepped up in accordance with the amounts counted on the counting switches.

As soon as the counting switch has reached the marked position and has stepped up the corresponding adding switch, it returns to its initial position, ready to be stepped up again by a following price marking. The adding switch however remains in its set position to be moved further when the next price marking is received, thus adding up the prices of successive articles. As will be described in detail later on these added up prices can be indicated on a lamp indicator to show progressively the added up value of one order. It may be mentioned here that an indication of the price of the last item can be provided if necessary. The lamp indicators can be provided with "0" lamps, which light up whenever no value of the corresponding denomination is to be recorded.

When the wiper of the penny adding switch PA (Fig. 6) reaches a contact corresponding to twelve pence, it continues to add up the prices, but stores the shilling amount in a relay CC which steps up the shilling adding switch SA as soon as this switch has finished counting the shilling amount set up in one of the shilling price storage groups.

As soon as the shilling adding switch has reached a position corresponding to 20/– a pound switch LA (Fig. 6) is stepped up one step by the operation of relay SC at the same time setting the shilling adding switch back to its initial (home) position.

No half-penny price storage groups are provided but the half-pennies are marked on the relays 1H and 1HP (Fig. 2) for the first price marking to light up the half-penny lamp HL (Fig. 7) over contact 1hp3 (Fig. 3). When the next half-penny is priced in the same order, this marking operates over the contact 1hp4 (Fig. 2) the relays 2H and 2HP which energise the relays 1HC and 2HC (Fig. 3) to store the penny-amount until the pennies marked at the same time have been counted by the penny counting switches.

While the adding switches are put back to their home position, when an order is completed, to be ready for the adding up of the prices of the following order, the added up price of an order is transferred to a totalling device (Figs. 7 and 8). This totalling device consists of the switches PU for pennies, SU for shillings and LU for pounds and the message registers GP, GS, GR respectively for the various denominations. Additionally provision is made to add up the half-pennies in a message register GH.

Besides the message registers which record the total sales over a certain time period separate message registers (1VH, 2VH, 1VP, 2VP, 1VS, 2VS, 1VR, 2VR) (Fig. 8) are provided to give a record of the sales of each individual salesman.

Before the operation of the circuits is described in detail in connection with a specific example a general description of the functions of the principal relay and switch circuits is given hereafter.

Figure 4:
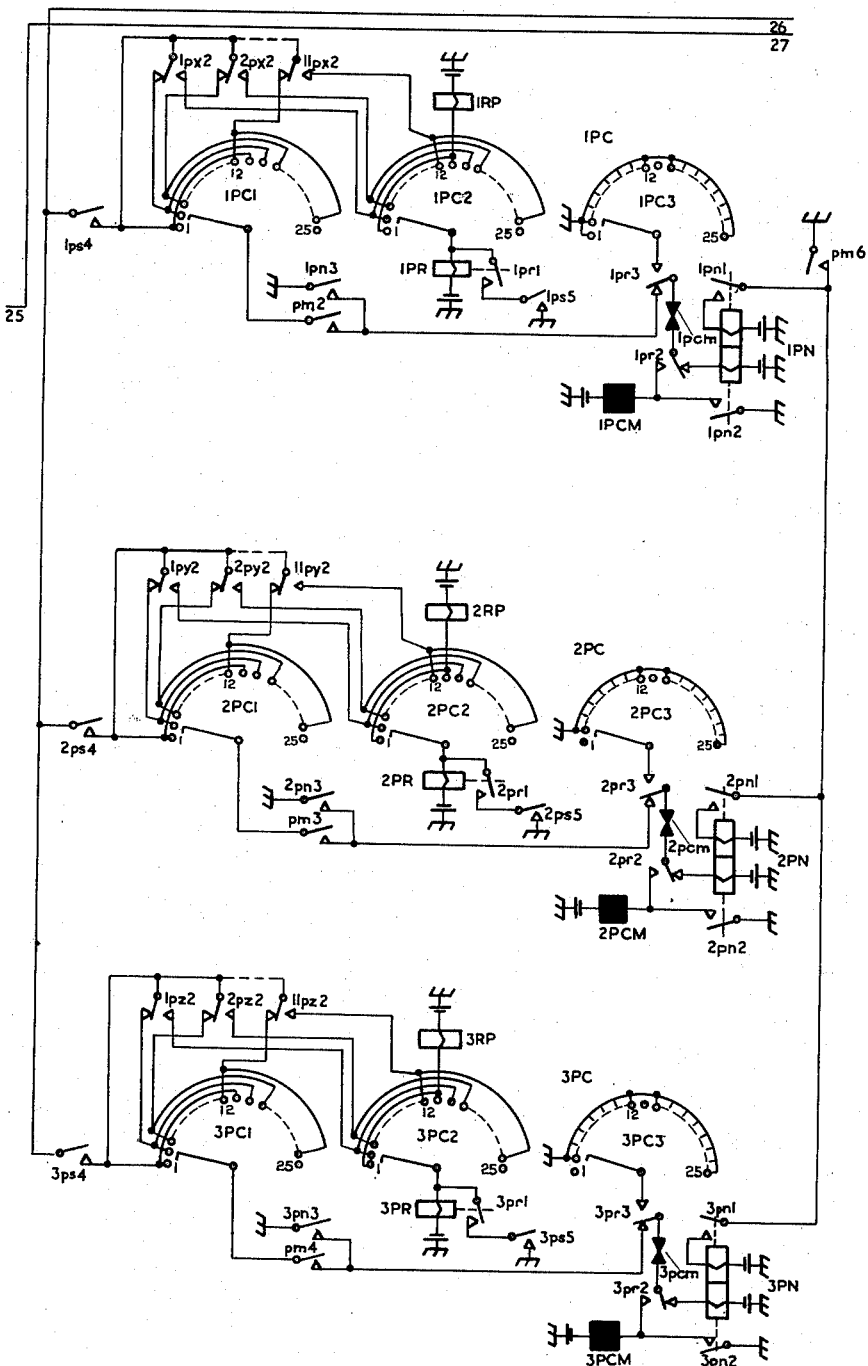
Fig. 4 shows the penny counting devices.

As mentioned before the prices marked by applying earth to the pricing frame are stored in the penny storage relays 1PX to 11PX, 1PY to 11PY and 1PZ to 11PZ (Fig. 2) which operate their respective contacts 1px1, 1px2 to 11px1, 11px2; 1py1, 1py2 to 11py1, 11py2 and 1pz1, 1pz2 to 11pz1, 11pz2 and which fulfil one function only, that is to mark a certain position on one of the penny counting switches (1PC, 2PC, 3PC Fig. 4). One of these switches, each of which has three contact banks (1PC1, 1PC2, 1PC3 . . .) starts hunting for a marked terminal as soon as a start impulse is received from one of the penny start relays 1PS (Fig. 3) with contacts 1ps1 to 1ps6; 2PS with contacts 2ps1 to 2ps6 or 3PS with contacts 3ps1 to 3ps6 depending on the penny storage relay group which has stored the price to be counted. While one of these relays is operated, the circuits for the other relays are interrupted, for example if relay 2PS is operated it breaks at its contacts 2ps2 and 2ps3 the circuits for the relays 1PS and 3PS respectively.

The operated penny counting switch steps up the penny adding switch PA (Fig. 6) with the four contact banks PA1, PA2, PA3 and PA4 corresponding with the amount of pennies to be recorded. Relays 1PN, 2PN and 3PN (Fig. 4) connected with the penny counting switches and operating their contacts 1pn1 to 1pn4, 2pn1 to 2pn4 and 3pn1 to 3pn4 respectively ascertain that the counting and adding switches remain in step, as they will operate only by combined operation of the magnets of both the switches. An auxiliary relay PM (Fig. 5) with contacts pm1 to pm6 is connected with the interrupter contact springs pam of the magnet PAM of the penny adding switch and controls the operation of this magnet.

As soon as the penny counting and the penny adding switch have reached their position corresponding to the marked penny amount, the counting switch is stepped back to its initial position under the influence of the corresponding penny re-setting relay 1PR, 2PR or 3PR (Fig. 4) with the contacts 1pr1 to 1pr3, 2pr1 to 2pr3 and 3pr1 to 3pr3. As soon as the counting switch (1PC, 2PC or 3PC) has reached its home position with its wiper on contact 1 a penny re-set pilot relay 1RP, 2RP or 3RP operates its contacts 1rp1, 1rp2; 2rp1, 2rp2 or 3rp1, 3rp2 to re-set all the penny relays associated with its particular group.

The bank PA2 of the penny adding switch PA (Fig. 6) is wired to the penny indicating lamps PL to indicate at any time the penny amounts added up at the adding switch.

As the penny storage relays 1PX..., 1PY..., 1PZ... (Fig. 2) are operated as soon as one of the clutch relays CR (Fig. 1) is energised, additional penny pilot relays XP, YP, ZP (Fig. 2) with contacts $xp1$ to $xp6$, $yp1$ to $yp6$, $zp1$ to $zp6$ respectively are provided for each relay storage group. As long as earth is applied to the pricing frame by the contacts of a CR relay the appropriate pilot relay is short-circuited, but as soon as the relay CR releases when a selected article is released from its bin and operates its trip contact TC, the penny pilot relay of the respective storage group is energised in series with the penny storage relay energised before and operates one of the penny change-over relays 1P, 2P or 3P (Fig. 2) which in turn over contacts $p1$ to $p4$ changes the pricing leads 7 to 9 over to the next group of penny storage relays.

A similar arrangement as described above for the penny marking is provided for the shilling counting and adding.

Figure 5:
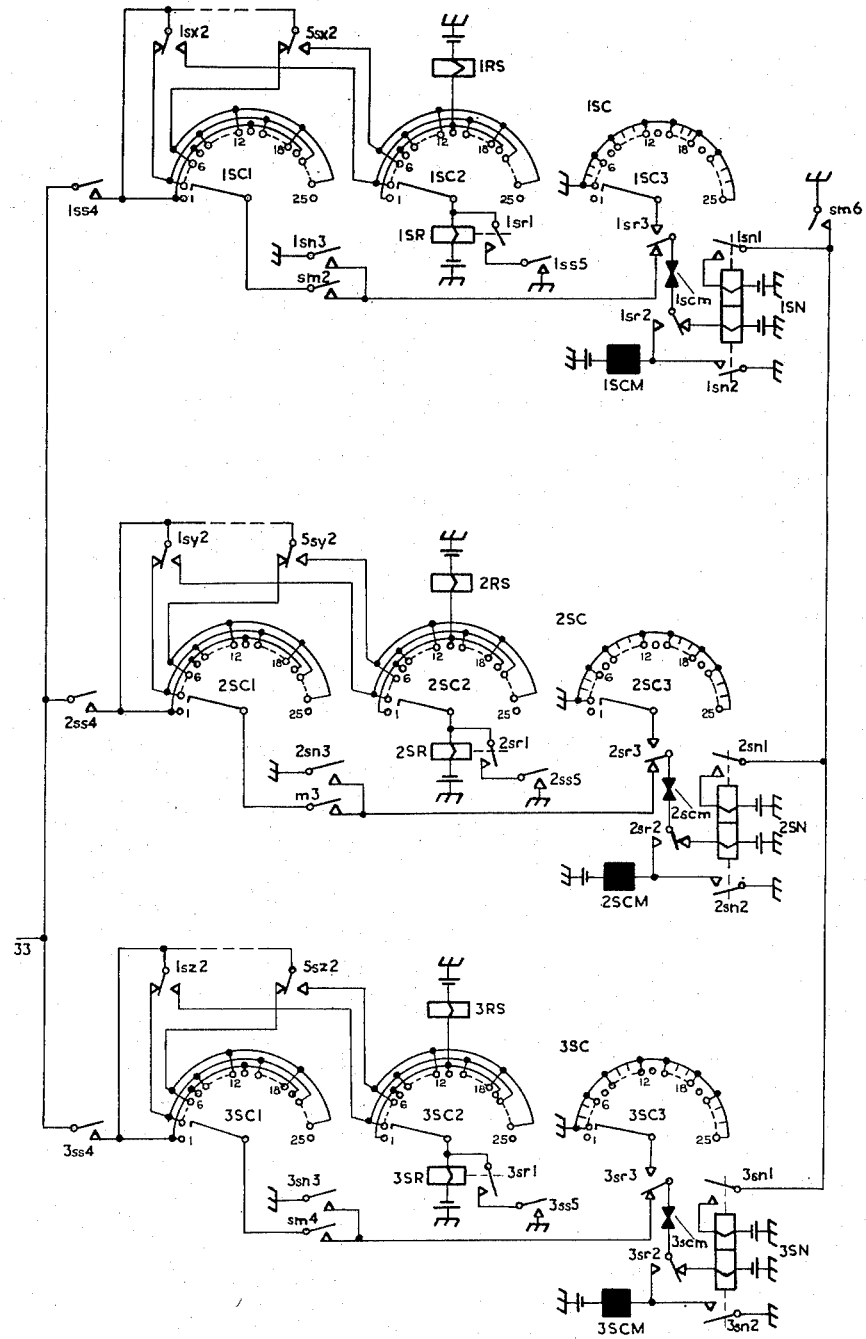
Fig. 5 shows the shilling counting devices.

The shilling storage relays 1SX to 5SX (Fig. 2) with contacts $1sx1$ to $5sx2$, 1SY to 5SY with contacts $1sy1$ to $5sy2$ and 1SZ to 5SZ with contacts $1sz1$ to $5sz2$ mark the corresponding shilling counting switches 1SC, 2SC, 3SC (Fig. 5). Although only storage relays for values up to five shillings are described in the example it must be understood that further relays can be added when the prices over 5/- for one single article have to be recorded.

One of the shilling start relays 1SS, 2SS or 3SS (Fig. 3) with the six contacts $1ss1$ to $1ss6$, $2ss1$ to $2ss6$, $3ss1$ to $3ss6$ operates one of the shilling counting switches as described for the penny counting and thus the shilling adding switch SA (Fig. 6) with the four banks SA1, SA2, SA3 and SA4 is stepped up to indicate the added up amount on the shilling lamp indicator SL connected with contacts of the bank SA2. To keep the counting and the adding switch in step relays 1SN, 2SN and 3SN (Fig. 6) with their four contacts each are connected with the counting switches, and an auxiliary relay SM (Fig. 6) (contacts $sm1$ to $sm7$) connected with the interrupter contact springs $sam$ of the magnet SAM for the shilling adding switch SA control this magnet.

The shilling counting switches (Fig. 5) are stepped home under the control of the shilling resetting relays 1SR, 2SR or 3SR each having three contacts and then one of the shilling re-set pilot relays 1RS, 2RS or 3RS is operated to restore over its two contacts all shilling relays of the corresponding group to normal. Shilling pilot relays XS, YS and ZS (Fig. 2) connected with the shilling storage relays of the three storage groups operate their respective contacts $xs1$ to $xs6$, $ys1$ to $ys6$ or $zs1$ to $zs6$ as soon as a selected article has been released from its corresponding bin and thus operate one of the shilling change-over relays 1S, 2S or 3S to connect over their respective contacts $s1$ to $s6$ the next storage group with the leads 10, 11 leading to the pricing frame PFR (Fig.1).

When the penny adding switch PA (Fig. 6) has reached a position corresponding to twelve pennies the shilling adding switch SA must be stepped up one step. For this purpose a coupling circuit relay CC with contacts $cc1$ to $cc6$ is connected with the penny adding switch PA. In case the shilling adding switch is still operating the relay CC stores the shilling indication until the shilling adding switch has finished counting. To transfer the shilling indication stored in relay CC to the shilling adding switch SA a coupling circuit pilot relay BC with contacts $bc1$ and $bc2$ is operated over contact $cc1$ when the three shilling start relays 1SS, 2SS, 3SS (Fig. 3) are unoperated and thus the contacts $1ss6$, $2ss6$ and $3ss6$ (Fig. 6) are closed.

As soon as the shilling adding switch SA has made one step corresponding to the twelve pennies marked on the penny adding switch an auxiliary coupling relay AC with contacts $ac1$ and $ac2$ is energised which interrupts at contact $ac1$ the circuit for the CC relay so that this relay cannot operate again even if the penny adding switch is still on the contact corresponding to twelve pennies (contact 13 of the contact bank). The penny adding switch PA remains on this contact as long as no further pennies are added up, while the relay CC is de-energised and the relay AC operated.

To enable an adding of prices exceeding twenty shillings, a pound adding switch LA (Fig. 6) with the contact banks LA1, LA2 and LA3 is operated whenever the shilling adding switch SA reaches its contact 21 corresponding to the added up amount of twenty shillings. A shilling coupling circuit relay SC is energised over this contact 21 of the bank SA1, operates its contacts $sc1$ to $sc3$ and over its contact $sc3$ operates the stepping magnet LAM of the pound adding switch LA. To control this operation an auxiliary relay M is operated over the interrupter contact springs $lam$ of the magnet LAM and controls overs its contact $m$ the circuit for the second winding of relay SC. Relay SC also initiates the return of shilling adding switch SA to its home position after the pound adding switch LA has been stepped up.

The indication of the pound amounts is carried out by the lamps of a lamp indicator LL wired to the bank LA1 of the pound adding switch LA. The circuits for the counting and adding of half-pennies are much simpler as no switches are required for this purpose.

As mentioned before a first half-penny relay 1H (Fig. 2) and a corresponding pilot relay 1HP with their contacts $1h$ and $1hp1$ to $1hp4$ are operated over lead 12 from pricing frame PFR (Fig. 1) and indicate one half-penny on the lamp indicator HL (Fig. 7), the first lamp of this indicator being used to indicate when the added prices contain no half-penny amount. The next half-penny amount transferred from the pricing frame then operates the relays 2H and 2HP (Fig. 2) with contacts $2h1$, $2h2$ and $2hp1$ to $2hp4$ which over the half-penny coupling relays (Fig. 3) 1HC (contacts $1hc1$ to $1hc6$) or 2HC (contacts $2hc1$ to $2hc6$) transfer the full penny amount to the penny adding switch PA (Fig. 6), when this switch is not any more operated by one of the penny counting switches. The transfer of this penny indication is controlled by the half-penny coupling pilot relays 1HD and 2HD (Fig. 3) with their respective four contacts $hd1$ to $hd4$ which operate over their contacts $1hd4$ and $2hd4$ (Fig. 6) respectively the magnet PAM of the penny adding switch.

The change-over from relay 1HC to relay 2HC (Fig. 2) i. e. from one half-penny storage group to another is performed by the half-penny change-over relay HO (Fig. 2) operating its contacts ho1 to ho6. An auxiliary relay HA (Fig. 3), operated depending on the relays 1HC or 2HC and relay HO frees the relays 2H and 2HP (Fig. 2) by opening its contact ha, so that these relays are ready to count another half-penny.

The relay and switch circuits mentioned above are related to the various denominations to be counted and added. Further circuit arrangements however have to be provided to enable a reliable working of the system. It might happen that all the price storage relay groups are occupied and in this case a pricing store relay PF (Fig. 3) is operated over the series contacts xs4 to xs6 for the shilling storage, xp4 to xp6 for the penny storage and 2hc3, 1hc3 and 2hp4 for the half-penny storage. The relay PF operates over its contact pf the relay F (Fig. 1) which in turn lights the busy lamp BL over contact f1 and removes earth from the keyboard at contact f2.

In case a price marking shall be cancelled because no article was available in the bin or for any other reasons a release relay RR (Fig. 3) is energised whenever the cancel key CK (Fig. 1) is operated. This relay opens its contacts rr1 to rr8 and thus prevents any of the relay XP, YP, ZP, XS, YS and ZS, which had not been operated before, from being energised and interrupts the circuits for the half-penny storage relays.

When an order has been completed and the adding switches have been stepped up in accordance with the total value of this order, this value is then transferred to the totalling device which will be described in detail later on in connection with Figs. 7 and 8. To re-set the adding switches for the next incoming order a total finish relay TF (Fig. 3) is operated via relays of the totalling device, removes earth from the wipers of the switches at its contacts tf1, tf3, and re-sets over its contacts tf2, tf4 and tf5 (Fig. 6) the adding switches PA, SA and LA by operating the various magnets over the contact banks PA4, SA4 and LA3 respectively; at contact tf6 earth is removed from the half-penny storage group. As soon as the adding switches have reached their home position the relays PT, ST and RT (Fig. 6) are temporarily energised to open the holding circuit for the relay OC (Fig. 8) at the contacts pt, st, rt (Fig. 3), this relay OC having been energised before by the operation of the "order complete" key OK to operate its contacts oc1 to oc5.

To safeguard against a double marking of prices when an article is released from its bin and earth is still on the pricing frame a clutch pilot relay CP (Fig. 3) is operated from the clutch control relay C (Fig. 1). The relay CP controls over its contact cp7 earth applied to the various bars of the pricing frame and furthermore closes over its contacts cp1 to cp6 (Fig. 2) holding circuits for the various change-over relays 1P to 3P and 1S to 3S, so that these relays cannot change over to the next storage groups until relay CP has released and has removed earth from the pricing frame thus prohibiting a double price marking in two successive relay storage groups.

The operation of the various circuits will now be described in more detail by following a specific price indication.

It may be assumed that an article priced at eleven pence has been keyed up by operating one of the CR relays (Fig. 1) and the C relay in series therewith. Relay CA is operated over contact c1 and over contact c2 and lead 17 relay CP (Fig. 3) is energised to put earth via contact cp7, lead 16 and one of the contacts 1cr3, 2cr3 . . . (Fig. 1) on to the pricing frame PFR and thus to the 11d bar and the lead 9 connected with contact 1p3 (Fig. 2), to operate relay 11PX. Over contact 11px1 a new circuit is prepared for relay 11PX via contact rr1, relay XP, contact 1rp2 to earth, but relay XP cannot operate as it is short-circuited by earth from the pricing frame. At the same time a marking is prepared at the twelfth contact of the contact bank 1PC2 (Fig. 4) by the contact 11px2. When the selected article is released from its bin and has temporarily opened its corresponding trip contact TC as mentioned before, the CR relay of this bin and relay C are released and thus earth is removed from the pricing frame and lead 9, so that relay XP can now operate in series with relay 11PX. Contact xp5 shunts contact rr1 of relay RR so that contact rr1 is inoperative in case relay RR is operated via the cancel key CK (Fig. 1). The relays 1PS (Fig. 3) is now energised from earth over the contacts 2hc6, 1hc6, cc5, 3rp1, 2rp1, 1rp1, operated contact xp6, contacts 2ps2, 3ps2, relay 1PS to battery. Relay 1PS closes a holding circuit from battery over its second winding, contacts 1ps1 and xp2 to earth.

Over contact 1ps4 (Fig. 4) a circuit is closed for relay 1PN from battery, relay 1PN, contact 1pr2, interrupter 1pcm, contact 1pr3, closed contact pm2 (as relay PM (Fig. 6) is normally operated over interrupter pam and contact tf2), wiper and contact 1 of switch bank 1PC1, closed contact 1ps4, lead 26, contact ac2 (Fig. 6), contact 1 and wiper of switch bank PA1, contact tf1 to earth. Relay 1PN (Fig. 4) closes its contact 1pn1 and thus forms a locking circuit over its second winding, contact 1pn1, closed contact pm6 to earth. A further locking circuit is closed from earth over contact 1pn3, contact 1pr3, interrupter 1pcm, contact 1pr2, relay 1PN to battery. Over the contact 1pn2 the switch magnet 1PCM and over the contact 1pn4 (Fig. 6) the switch magnet PAM are energised to step up the penny counting switch 1PC and the penny adding switch PA.

The circuit is so arranged that both switches must make an equal number of steps before relay 1PN can release again. When magnet 1PCM operates it interrupts the circuit for one winding of relay 1PN at interrupter 1pcm and when magnet PAM operates it interrupts the circuit for relay PM at interrupter pam, which in turn interrupts the second locking circuit for relay 1PN at contact pm6. As soon as both switches have stepped up one step and relay 1PN has been released, this relay is energised again as the circuit runs now from contact 1ps4 (Fig. 4) over contact 1px2, second contact of switch bank 1PC1 and then the same way as described above. Thus the switches 1PC and PA are stepped up together. The switches are so arranged that the interrupter contacts for their magnets are only closed after the switches have made their required steps.

As soon as the switches 1PC and PA are stepped up eleven steps corresponding to the price of 11d the operating circuit for relay 1PN is interrupted at contact bank 1PC1 as contact 11px2 is operated. At the same time a new circuit is closed from earth via contact tf1 (Fig. 6) wiper and twelfth contact of switch bank PA1, contact ac2, lead 26, contact 1ps4 (Fig. 4), contact 11px2, twelfth contact and wiper of switch bank 1PC2, relay 1PR to battery. This relay closes a locking circuit over the contacts 1pr1 and 1ps5 to earth. While the magnet PAM of the adding switch remains unoperated, the magnet 1PCM of the counting switch is now stepped up from earth via the switch bank and wiper 1PC3, operated contact 1pr3, interrupter 1pcm, operated contact 1pr2, magnet 1PCM to battery.

When the counting switch 1PC (Fig. 4) reaches its home position or its equivalent with wipers resting on the first or the thirteenth contact of the switch-banks, relay 1RP is energised from earth over contacts 1ps5, pr1, wiper and contact of switch bank 1PC2, relay 1RP to battery.

At contact 1rp2 (Fig. 2) the locking circuit for the relays XP and 11PX is interrupted, so that these relays release. Relay XP opens the locking circuit for relay 1PS (Fig. 3) at contact xp2. The release of relay 1PS performs the release of relays 1PR and 1RP (Fig. 4) at contact 1ps5. Relay XP is a slow-release relay to ensure that relay 11PX has released and opened its contacts 11px1 before relay 1RP releases, to prevent the relay 11PX from coming up again over contact 1rp2.

The price is now indicated at the penny lamp indicator PL (Fig. 6) from battery over the lamp corresponding to 11d and connected with the twelfth contact of switch bank PA2 over the wiper, lead 27, lead 25, contact OS (Fig. 3), contacts xp3, yp3, zp3, xs3, ys3, zs3, 1hc6, 2hc6 to earth. The series of break contacts of the various group relays prohibits a lighting up of the indicator lamps while the adding is still in progress and the wiper passes over the contacts of its bank. The contact OS is part of an "order start" key and is closed until one order has been completed. Thus the lamp indicators are extinguished after an order has been fulfilled and remain dark until the next order is started. This contact is shown within dotted lines to indicate that it is not essential for the working of the arrangement.

Relay XP (Fig. 2) which was operated in series with relay 11PX, also energises over its contact xp1 the change-over relay 1P. Over the contacts 1p1, 1p2 and 1p3 the various leads 7, 8, 9 from the pricing frame are changed over to the second group of penny storage relays 1PY to 11PY via the contacts 2p1 to 2p3. Although only three relays are shown in each storage group it must be understood that eleven relays and the corresponding contacts on the relays 1P, 2P and 3P are provided to enable a price storage up to 11d.

To prevent a release of relay 1P when the adding of the first price is finished while a second price is about to be stored in the second group, a locking circuit is provided for relay 1P over its own contact 1p4 and contact cp1 of relay CP to earth. Relay CP (Fig. 3) is always operated when an article has been selected but has not yet been discharged from its bin. This locking circuit prevents a price marking which is to be stored in the second group to set up an additional marking in the first group. This locking of relay 1P however does not effect the counting and adding of a price stored in the third storage relay group (relays 1PZ to 11PZ).

As soon as earth is removed again from the pricing frame PFR (Fig. 1) when the second article, priced for example with 2d, has left its bin, relay YP (Fig. 2) comes up in series with relay 2PY in the same manner as described for relay XP and prepares over its contact yp6 (Fig. 3) a circuit for relay 2PS. At the same time a contact corresponding to 2d is marked on the second contact bank 2PC2 (Fig. 4) of the second penny counting switch by the change-over contact 2py2.

Figure 6:
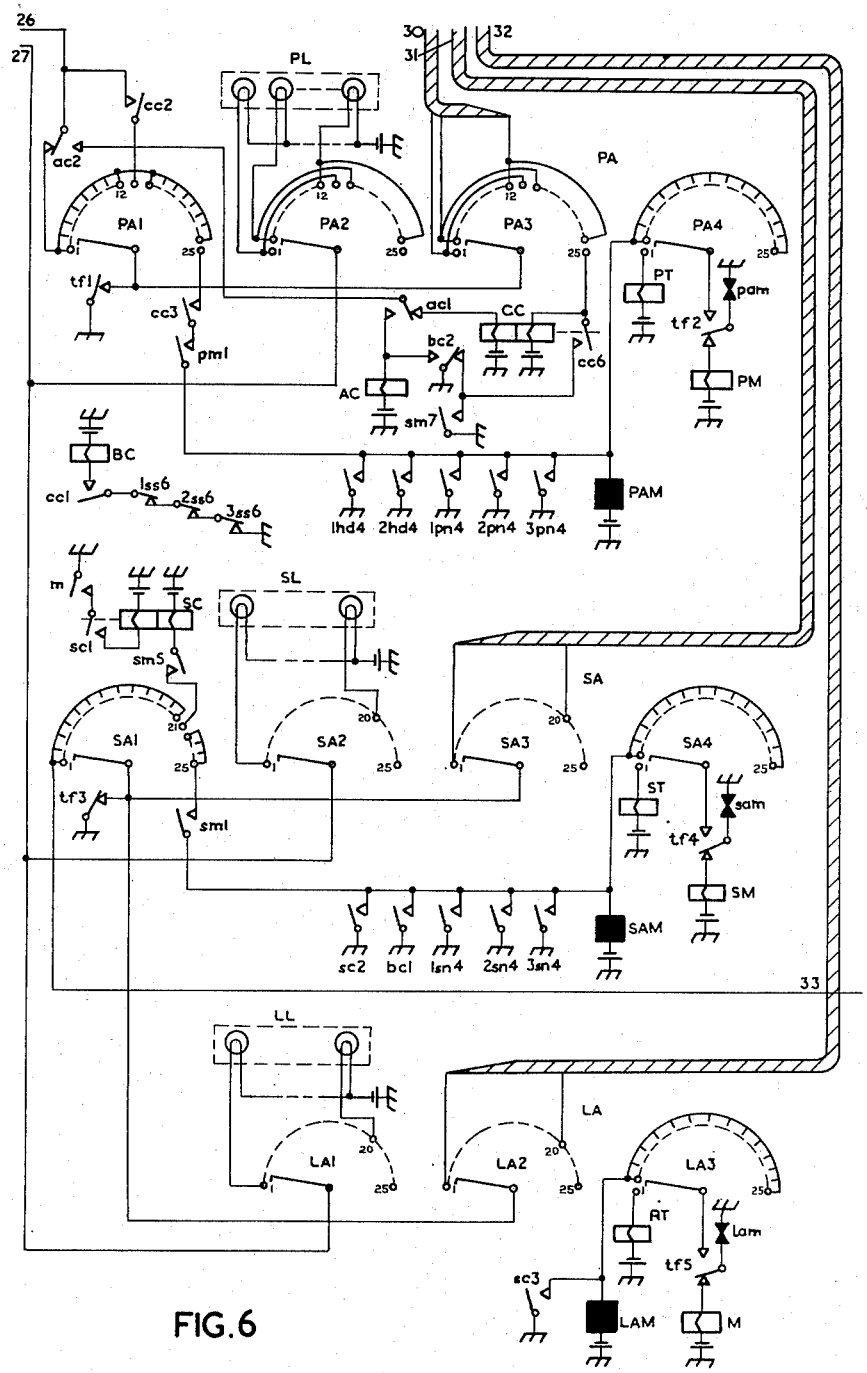
Fig. 6 shows the circuit arrangements for the adding of pennies, shillings and pounds and the operation of corresponding indicator lamps.

While the adding of the first price is still in progress relay 2PS (Fig. 3) cannot operate as its circuit is still interrupted at contact xp6, but as soon as the relays XP (Fig. 2) and 1RP (Fig. 4) release (see above) relay 2PS operates from earth via contacts 2hc6, 1hc6, cc5, 3rp1, 2rp1, 1rp1, xp6, operated contact yp6, contacts 1ps2, 3ps3, relay 2PS to battery. At the contacts 2ps2 and 2ps3 the energising circuits for the relays 1PS and 3PS respectively are interrupted so that these relays cannot operate while the counting and adding of the second storage group is still in progress. Relay 2PS operates in the same manner as described above for the relay 1PS, but is connected witht he second counting switch 2PC (Fig. 4) so that now relay 2PN is operated and the stepping up of the switches proceeds over contact 2ps4 and lead 26 to the penny adding switch PA (Fig. 6). Thus the penny adding switch is stepped up further together with the second penny counting switch 2PC.

When the penny adding switch PA (Fig. 6) reaches its thirteenth contact corresponding to twelve pennies, the shilling adding switch SA has to be stepped up one step. This is done in the following manner:

At the thirteenth contact of bank PA1 (Fig. 6) the circuit for the relay 2PN (Fig. 4) is interrupted and a new circuit is closed for relay CC (Fig. 6) from earth over contact tf1, wiper and thirteenth contact of PA1, contact ac1, relay CC to earth. Over contact cc6 a locking circuit is closed over the second winding of relay CC and the normally closed contact sm7 of relay SM in parallel with contact bc2 to earth. Over contact cc2 the circuit for relay 2PN (Fig. 4) is re-established again, so that the rest of the stored pennies (in this example 1d) can be added up at switch PA. At the contacts cc5 and cc4 (Fig. 3) the circuits for the penny start relays 1PS and 3PS and the shilling start relays 1SS to 3SS respectively are interrupted to prohibit the adding of additional pennies of other storage groups or the adding of shillings until the shilling adding switch SA (Fig. 6) has made its step to mark the twelve pennies set up at the penny counting switch PA.

Over contact cc1 (Fig. 6) of relay CC the BC relay is energised from battery over relay BC, contacts cc1, 1ss6, 2ss6, 3ss6 to earth. The three latter break contacts prohibit an operation of relay BC while counting of shillings is still in progress and one of the shilling start relays 1SS, 2SS or 3SS (Fig. 3) is operated. The relay BC energises the magnet SAM of the shilling adding switch SA over contact bc1 and interrupts the circuit for one winding of the CC relay at contact bc2 at the same time energising relay AC. Relay CC however is still kept up over contact sm7. Magnet SAM interrupts temporarily the circuit for relay SM at interrupter sam. Thus contact sm7 opens and releases relay CC, which in turn releases relay BC. The opening of contact bc1 deenergises the magnet SAM which thus steps the switch SA up one step to add a shilling. As the contacts cc4 and cc5 (Fig. 3) are closed again, further shillings and pennies can be added. At contact bc2 (Fig. 6) the circuit of relay AC is interrupted again. The function of this relay is to prevent the CC relay from coming up again in case the PA switch has finished adding on the thirteenth contact. Relay AC is then kept energised from earth via contact $tf1$, wiper and contact bank PA1, contact $ac1$, relay AC to battery. Thus this relay remains energised even when CC has released. For further adding the circuit for one of the PN relays (Fig. 4) is established over the contact $ac2$, until the wiper of PA1 leaves the thirteenth contact and releases relay AC so that the whole circuit returns back to normal.

The storage, counting and adding of the shilling amounts, set upon the pricing frame PFR (Fig. 1) and transmitted to the storage relays 1SX to 5SX, 1SY to 5SY and 1SZ to 5SZ over the leads 11 and 12 proceeds in the same manner as described above for the pennies. The relays and switches have the same marking except that the letter "P" is replaced by the letter "S." When for example 5/— are marked on the pricing frame, relay 5SX (Fig. 2) is energised and as soon as earth is removed from lead 12 (when the article has left its bin) relay XS operates and energises the starting relay 1SS (Fig. 3) from earth via contacts $cc4$, $3rs1$, $2rs1$, $1rs1$, operated contact $xs6$, contacts $2ss2$, $3ss2$, relay 1SS to earth. Contact $1ss4$ (Fig. 5) closes the circuit for the relay 1SN which now operates over switch banks 1SC1 and SA1 (Fig. 6) in the same way as relay 1PN over the corresponding penny switches 1PC1 and PA1. The shilling switches are thus stepped up until they reach the sixth contact marked by the contact $5sx2$ at switch bank 1SC2 (Fig. 5). Then relay 1SR is energised which returns the counting switch 1SC back to its home position or its equivalent, but does not effect the adding switch SA. When this home position is reached (first, seventh, thirteenth or nineteenth contact of the contact bank) relay 1RS is operated over wiper and switch bank 1SC2 and the circuits are restored to normal as described above for the penny counting.

The indication of shilling amounts is carried out over the wiper and contact bank SA2 and the lamp indicated SL, the circuit passing through the came lead 21 and the same contacts as described for the penny lamps PL.

Provision is made to give an indication of pound amounts as soon as the shilling adding switch SA (Fig. 6) has reached a position corresponding to twenty shillings. In this case the wipers of switch SA rest on the twenty first contact of each bank and at bank SA1 the circuit for one of the relays 1SN, 2SN or 3SN (Fig. 5) which is just operating the adding switch SA is interrupted. The relay SC (Fig. 6) is energised from earth over contact $tf3$, wiper and contact bank SA1, normally closed contact $sm5$, relay SC to battery. This relay closes a locking circuit for its second winding over the normally closed contact $m$ and contact $sc1$. Over contacts $sc2$ and $sc3$ the magnets SAM and LAM respectively are energised and open their interrupter contacts $sam$ and $lam$. Thus the relays SM and M are deenergised, open their contacts $sm5$ and $m$ thus interrupting the circuits of the two windings of relay SC. Relay SC releases when both magnets are thus energised and breaks the circuits for the magnets SAM and M at the contacts $sc2$ and $sc3$. The magnets when releasing step the shilling adding switch SA and the pound adding switch LA up one step and the pound amount is indicated on the indicator lamps LL via the wiper and contact bank LA1 in the same way as mentioned before for the penny and shilling indicators PL and SL.

The shilling adding switch is now on its twenty second contact and a circuit is made from earth over contact $tf3$, wiper and contact bank SA1, contact $sm1$, magnet SAM to battery. By intermittent operation of relay SM and magnet SAM switch SA returns back to its initial position, so that it is ready again to add up further shilling amounts. The penny relay groups and the shilling relay groups are independent of each other so that when a price containing only shillings and no pennies is to be counted, no relays of the penny groups are operated and vice versa except when twelve pennies are reached at the penny adding switch, which are then transferred to the shilling adding switch.

The arrangement for the counting and adding of half-pennies is different from the arrangements described above for pennies and shillings and will be described now: When earth is applied to the $\frac{1}{2}d$ bar of the pricing frame PFR (Fig. 1) and thus to lead 12, the relay 1H (Fig. 2) is energised over contact $1hp4$ and closes its contact $1h$ thus providing a new circuit from battery over relay 1H, relay 1HP, contact $1h$, contact $rr4$, contact $2hp2$, contact $tf6$ to earth, thus also energising relay 1HP as soon as earth over lead 12 is removed at the pricing frame. Relay 1HP closes its contact $1hp1$ parallel to contact $rr4$. By operating contact $1hp3$ (Fig. 3) the "1" half-penny lamp in the lamp indicator HL (Fig. 7) lights up over leads 29, 24 (Fig. 8), contact $1hp3$ (Fig. 3) and the common lamp circuit. If no half-pennies were called up the "0" half-penny lamp would light up over contact $1hp3$ in its unoperated position and the lead 23, 28. At contact $1hp4$ (Fig. 2) the lead 12 is now connected with the relay 2H which will operate when the next half-penny is recorded at the pricing frame. Relay 2H closes its contact $2h1$ which prepares the circuit for relay 2HP as soon as earth is removed from lead 12 (when the article is released from its bin and has operated its trip contact TC). At contact $2hp2$ the circuit for the relays 1H and 1HP is interrupted so that these relays release and are now ready for the next counting of an half-penny. Over contact $2hp1$ the contact $rr5$ is bridged, so that an operation of relay RR has no effect on the relays 2H and 2HP while they are operated.

Over contact $2hp3$ (Fig. 3) a circuit is closed from earth via contact $2hp3$, contact $ho2$, relay 1HC to battery, which energises relay 1HC. This relay closes a locking circuit for itself over contacts $1hd3$ and $1hc1$. Over operated contact $1hc2$ and contact $ho3$ the HA relay is energised interrupting at contact $ha$ (Fig. 2) the circuit for the relays 2H and 2HP. Thus one penny marking is stored in relay 1HC.

At the released contact $2h2$ (Fig. 2) earth is put on to the relay HO via contact $1hc5$ and this relay locks itself from earth over contact $tf6$, contact $2hc5$, contact $ho1$, relay HO to battery. Relay HO changes over its contact $ho2$ (Fig. 3) to prepare a circuit for relay 2HC, when another penny has to be stored for adding.

At the contact $1hc6$ and $2hc6$ the circuit for energising the relays 1PS, 2PS or 3PS is interrupted so that the stored penny markings can be transmitted to the adding switch PA, as soon as the penny markings stored before and transmitted via the relays 1PS, 2PS, 3PS are added up. When these relays are in the unoperated position a circuit is closed from earth via the normally operated contact $pm5$, contacts $1ps6$, $2ps6$, $3ps6$, operated contact $1hc4$, contact $2hd2$, relay 1HD to battery. This relay locks itself over its own contact $1hd1$ and contact $pm5$ to earth, releases relay 1HC at contact 1hd3, and contact 1hd4 (Fig. 6) energises the switch magnet PAM which at interrupter *pam* interrupts the circuit for relay PM so that at contact *pm5* (Fig. 3) the circuit for relay 1HD is interrupted. Relay 1HD releases magnet PAM which thus steps the penny adding switch PA up one step to count the penny stored in relay 1HC. The next penny stored in relay 2HC is added in the same way via the relay 2HD (Fig. 3) which is now energised from earth via contact *pm5*, contacts 1*ps6*, 2*ps6*, 3*ps6*, contact 1*hc4*, operated contact 2*hc4*, contact 1*hd2*, relay 2HD to battery. The operation of the penny adding switch proceeds in the same manner as described before, as contact 2*hd4* (Fig. 6) operates parallel to contact 1*hd4*.

While the half-penny markings are stored and the relay contacts 2*hp4*, 1*hc3* and 2*hc3* (Fig. 3) are closed relay PF will operate and energise over contact *pf* and lead 15 relay F (Fig. 1) which over contact *f2* removes earth from the keyboard (K0 to K9), and lights up the "busy" lamp BL over contact *f1*, to prohibit a further keying up of articles until the penny markings are transferred to the penny adding switch PA and at least one of the relays 2HP, 1HC or 2HC has released.

The same control is performed by the PF relay (Fig. 3) when all the penny storage groups are full and the relay XP, YP and ZP (Fig. 2) are energised and close a circuit for relay PF (Fig. 3) over the contacts *xp4*, *yp4* and *zp4*. A similar circuit over contacts *xs4*, *ys4* and *zs4* indicates that all shilling storage groups are full.

If, for example, an article keyed up on the keyboard is out of stock, the "busy" lamp BL remains alight over contact *ca4* and then the cancel key CK (Fig. 1) is operated which thus temporarily energises over lead 18 slow release relay RR (Fig. 3). Over one of its contacts *rr1* to *rr8* (Fig. 2) the circuit for the relay storage group, which was just operated, is interrupted, but as the contacts are by-passed as soon as an article has been released from a bin, all the relays set up by preceding selections remain unaffected.

When all the articles belonging to one order have been keyed up and released from their respective bins, the operator presses temporarily the "order complete" key OK (Fig. 1) and thus energises over lead 14 the relay OC (Fig. 8) which in turn closes a locking circuit over its second winding, contact *oc4*, lead 19 and the parallel connected contacts *pt*, *st* and *rt* (Fig. 3). The contacts *oc1*, *oc2*, *oc3* (Fig. 8) and *oc5* (Fig. 7) operate the totalling device (Figs. 7 and 8) which will be described later on in detail. This totalling device transfers the indications of the price adding switches PA, SA and LA (Fig. 6) and any half-penny indication to the corresponding message registers GH, GP, GS and GR (Fig. 8).

When this transfer is completed the contacts *tn3*, *kp*, *ks* and *kr* (Fig. 8) are closed and over lead 20 the relay TF (Fig. 3) is energised. This relay opens its contacts *tf1*, *tf3* (Fig. 6) and *tf6* (Fig. 2) and changes over its contacts *tf2*, *tf4* and *tf5* (Fig. 6) to close a circuit for the magnets PM, SM and M over the wipers and contact-banks PA4, SA4 and LA3 respectively. As the interrupter contacts of the magnets are included in these circuits, the three adding switches are stepped back to their home position. As soon as the wipers reach their first contacts the circuit for the respective magnet is interrupted and the relays PT, ST and RT are energised to operate their contacts *pt*, *st* and *rt* (Fig. 3) to release the relay OC (Fig. 8). Thus relay OC is only released when all three switches are returned to their initial positions.

The release of relay OC initiates the release of relay TF, as will be seen later, and when the contacts *tf2*, *tf4* and *tf5* have changed back again and relay PT, ST and RT are de-energised again and all the circuits are now ready to take the price indication for another order.

As mentioned before a totalling device (Figs. 7 and 8) is provided to give an account about all the sales made over a certain time period. For this purpose each of the adding switches PA, SA and LA (Fig. 6) has a contact bank PA3, SA3 and LA2 respectively, which is connected via the cables 30, 31 and 32 with a corresponding contact bank PU1 (Fig. 7) of the penny totalling switch PU, contact bank SU1 of the shilling totalling switch SU and contact bank LU1 of the pound totalling switch LU.

When an order is completed and the operator has pressed the "order complete" key OK (Fig. 1) as mentioned before, the totalling switches PU, SU and LU hunt for the marked contacts on the contact banks of the adding switches PA, SA and LA and at the same time step up their respective message registers GP, GS and GL (Fig. 8), the message register GH for half-pennies being stepped up separately. When the amounts are transferred from the adding switches to the message register, the totalling switches return to their home position and all the adding switches and corresponding relays are restored to normal ready for the next order.

The function of the various circuits in the totalling device will be described hereafter in detail. As mentioned before, when an order has been completed the operator has pressed the "order complete" key OK (Fig. 1) and has operated over lead 14 the relay OC (Fig. 8) which closes its contacts *oc1* to *oc5* and over contact *oc5* (Fig. 7) energises the relays FP, FS and FR.

If, for example, the penny totalling switch PA (Fig. 6) shows an amount of ten pennies and its wipers thus rest on the eleventh contact of each corresponding contact bank, earth is connected via contact *tf1* to the wiper and contact eleven on the contact bank PA3 and from there via one lead in cable 30 to the eleventh contact on the contact bank PU1 (Fig. 7) of the penny totalling switch PU.

When the relay FP (Fig. 7) has closed its contacts *fp1* to *fp3*, a circuit is closed from earth via contacts *np2*, *mp2*, *tp4*, the interrupter contact *tpm*, contact *tp3*, relay BP, closed contact *fp3*, relay AP to battery, thus energising the relays BP and AP in series. Over contact *bp2* the two contacts *np2* and *mp2* are by-passed and a locking circuit for relay BP is further provided from earth over contact *mp1*, closed contact *bp1*, a second winding of relay BP to battery. Over contact *bp3* the magnet TPM of the switch PU is energised and over contact *bp6* (Fig. 8) the message register GP is stepped up one step. At the same time one of the salesmen message registers (1VP or 2VP) is stepped up oved contact *bp5* as will be described in detail later on. The message registers have contacts which are closed each time their magnets are energised and thus contact *gp* and one of the salesmen register contacts 1*vp* or 2*vp* are closed to energise the relays MP and NP respectively. When both relays are energised, indicating that the message registers are stepped up one step, the contacts *mp1*, *np1*, *mp2* and *np2* (Fig. 7)

are interrupted thus opening the locking circuit through one winding of relay BP, while the circuit through the other winding is broken at the interrupter contact *fpm*, operated by magnet TPM. The relay BP will thus release. This circuit arrangement thus makes the operations of relay BP dependent on the operation of the message registers to ensure that the totalling switch cannot step up until the message registers have stepped up as well.

As soon as relay BP is released, the magnet TPM releases and steps the switch PU up one step. The whole cycle of operations repeats itself for further stepping up of the totalling switch PU and the message registers until the wipers reach the eleventh contact which is earthed on the contact bank PU1 from the adding switch PA (Fig. 6) as mentioned before.

Relay AP will now operate again, but relay BP cannot come up as it is short circuited by the earth on the contact bank. As the contacts on the contact bank PU2 are connected in parallel to the contacts of contact bank PU1, earth on contact eleven closes a circuit over contact bank and wiper PU2, closed contact *ap*, contact *bp*4, relay TP to battery. This relay established a locking circuit for itself over the closed contacts *fp*2 and *tp*1. At contact *tp*2 a new circuit is established for relay AP over contact *fp*3, and at contact *tp*3 the circuit for relay BP is interrupted and a new circuit is closed for the TPM magnet from earth over contact bank and wiper PU3, contact *tp*4, interrupter contact *tpm*, contact *tp*3, magnet TPM to battery, so that the switch PU is now stepped back to its initial position where the circuit is interrupted at contact bank PU3.

When the wipers have reached the first contact again relay KP is energised from earth via the operated contact *fp*2 and *tp*1, the contact *bp*4, the closed contact *ap*, wiper and first contact of contact bank PU2, relay KP to battery. This relay closes its contact *kp* (Fig. 8) and when the indications of the other denominations are all transferred to the message registers, the contacts *tn*3, *ks* and *kr* are closed as well, so that relay TP (Fig. 3) is operated as already described and returns the adding switches to their home position thus releasing relay OC. At contact *oc*5 the circuit for the relays FP, FS and FR is interrupted and for example relay FP opens its contacts *fp*2 and *fp*3 and breaks the circuits for the relays TP, KP and AP so that all the circuits for the penny totalling switch PU are reset to their initial position.

As relay KP is connected with the first contact of contact bank PU2 provision is made to prohibit this relay from operating when the corresponding adding switch (PA, Fig. 6) is in its initial position with earth at the first contact of contact bank PA3, before the "order complete" signal has been given. To achieve this purpose the contact *fp*1 (Fig. 7), of relay FP is inserted in the connection between the contact banks PU1 and PU2, closing the circuit for relay KP only after relay FP has been operated by the "order complete" relay OC. In this case as no pennies were marked on the penny adding switch PA (Fig. 5) no marking is transferred to the penny message registers.

The circuits and their functions described above for the totalling of penny amounts are identical with the circuits for totalling the shilling and pound amounts. In the sequence of operation the relay FS with contacts *fs*1 to *fs*3 and the relay BS with contacts *bs*1 to *bs*6 transfer the markings of the shilling adding switch SA (Fig. 6) over the shilling totalling switch SU (Fig. 7) to the shilling message registers GS and 1VS or 2VS (Fig. 8). Over their associated relays MS and NS with the contacts *ms*1, *ms*2 and *ns*1, *ns*2 (Fig. 7) the switch magnet TSM is stepped up over its interrupter contact *tsm* until a marked contact is reached. The relay AS with contact *as* and relay TS with the contacts *ts*1 to *ts*4 then restore the switch to its home position in which the relay KS is energised which closes contact *ks* (Fig. 8) in the circuit of relay TF (Fig. 3) to prepare the release of all circuits.

The corresponding relays for the transfer of pound indications from pound adding switch LA (Fig. 6) over the pound totalling switch LU (Fig. 7) to the pound message registers GR and 1VR or 2VR are the relays FR with contacts *fr*1 to *fr*3 and BR with contacts *br*1 to *br*6, the relays MR and NR (Fig. 8) associated the message registers and operating their contacts *mr*1, *mr*2 and *nr*1, *nr*2 (Fig. 7) respectively, the switch magnet TLM with its interrupter contact *tlm* and the relay TR with contacts *tr*1 to *tr*4 and KR with contact *kr* (Fig. 8) in the circuit of relay TF (Fig. 3).

The totalling of half-pennies in the half-penny message registers GH and 1VH or 2VH (Fig. 8) is made dependent on the half-penny counting relay 1HP (Fig. 2).

In case no half-penny has to be transferred to the message registers when the order is complete, the contact 1*hp*2 (Fig. 3) is in its unoperated position and when the "order complete" relay OC is operated a circuit is closed from earth over contact 1*hp*2 (Fig. 3), lead 21, contact *oc*2 (Fig. 8), relay TN to battery. Relay TN operates its contacts *tn*1, *tn*2 and *tn*3. Over contact *tn*1 a locking circuit is closed from battery over a second winding of relay TN, contact *tn*1, contact *oc*3 to earth. At contact *tn*2 the circuit for relay TH is interrupted and at contact *tn*3 the circuit for the operation of the relay TF (Fig. 3) is prepared, which when operated releases finally relay OC. The contacts *oc*2 and *oc*3 open and thus release the TN relay again.

When a half-penny has to be transferred to the message registers this is indicated by the energising of relay 1HP. When relay OC has been operated a circuit is closed from earth via contact 1*hp*2 (Fig. 3) via lead 22, contact *oc*1, contact *tn*2, relay TH to battery. Over contacts *th*1 and *th*2 one of the salesmen message registers 1VH or 2VH and the message register GH are stepped up one step at the same time closing their contacts 1*vh* or 2*ch* and *gh* and operating the corresponding relays NH and MH. As relay CS is operated whenever an amount has to be marked on a salesman register, relay TN is energised as soon as both relays NH and MH have closed their respective contacts *nh* and *mh*. Relay TN closes a locking circuit over its second winding and contacts *tn*1 and *oc*3 and interrupts at contact *tn*2 the circuit for relay TH which releases. When the "order complete" relay OC releases the relay TH is de-energised as mentioned before.

To record the turn-over of various salesmen, individual salesmen keys SK1 and SK2 (Fig. 1) are provided, which enable to record separately the sales made by two salesmen, but it must be understood that any number of salesmen keys can be provided. When no salesmen key is operated, the relays 1SB and 2SB (Fig. 1) and the common relay CS are in their unoperated position and the salesmen message registers are disconnected at the contacts 1sb1 to 1sb4 and 2sb1 to 2sb4 (Fig. 8). At the contacts cs1 to cs3 earth is put on to the leads 35, 37 and 38 which by-passes the contacts np2, ns2 and nr2 (Fig. 7) respectively, making the working of the totalling switches independent from the salesmen register 1VP, 2VP, 1VS, 2VS and 1VR, 2VR (Fig. 8). Earth at contact cs4 by-passes contact nh to make relay TN independent from any operation of the registers 1VH and 2VH.

When, for example, the salesmen key SK2 (Fig. 1) has been operated, relays 2SB and CS (Fig. 8) are operated and over the contacts 2sb1 to 2sb4 the salesmen message registers 2VH, 2VP, 2VS and 2VR are connected with the contacts th1, bp5, bs5 and br5 respectively which are closed when the message registers are to be stepped up.

At the contacts cs1, cs2 and cs3 earth is removed from the leads 35, 37 and 39 and switches over to the leads 34, 36 and 38 which connect with contacts np1, ns1 and nr1 in parallel to contacts mp1, ms1 and mr1 to make the operation of the totalling switches dependent on the stepping up of the various salesmen message registers. At contact cs4 earth is removed from contact mh so that relay TN is now dependent on the combined operation of contacts nh and mh.

Instead of salesmen keys which are kept in position by the operator until the order is finished push buttons operating a relay can be provided, whereby this relay would lock itself during the keying up of an order and would be automatically released when the totalling unit has completed its function and the sale is recorded in the message registers. Furthermore these push buttons can be connected over the salesmen relay with the "order complete" relay OC thus eliminating the "order complete" key OK. When an order is completed the operator presses the appropriate salesman button and thus gives the "order complete" signal and simultaneously transfers the indications set up at the adding device to the totalling device and the message registers.

The foregoing description shows the invention by way of example only. Instead of three storage relay groups and counting switches for one denomination more or less groups can be provided. If individual prices higher than five shillings have to be recorded additional relay circuits can easily be arranged. Although in the example shown the message registers indicate the various denominations as they are marked on the adding switches it can be arranged that a transfer takes place to the next higher denomination when the required amount in the lower denomination is reached. The arrangement is not restricted to the denominations described but can as well be adapted to any other denomination or the recording of any other value and/or classification assigned to each kind of article, as for example points of a rationing scale. It is possible to give two different indications for one kind of article at the same time, for example, the indication of the price and the ration points of an article. Two arrangements as described above are provided which operate from the same clutch relay. Two pricing frames allow for independent adjustment of prices and ration points.

Further modifications can be made within the scope of the invention to care for the requirements of each individual case

I claim:

1. In combination with a selecting and releasing mechanism for selecting and dispensing articles of different character from storage, a system for indicating and registering the values of dispensed articles comprising, a plurality of counting devices, each counting device including switching means settable in accordance with said values and counting means connected therewith to count one by one the number of units in any of said values in accordance with the setting of said switching means, said counting devices being effective upon the operation of the selecting mechanism to assume a position corresponding to the value of the article selected, further switching means for maintaining the operated counting devices in their respective operated conditions and effective upon operation of one counting device by said selecting mechanism to operatively connect the selecting mechanism to an unoperated counting device for operating said unoperated counting device in accordance with the value of the next selected article, an adding device interconnected with said counting devices for adding up one after the other the values indicated on each of the counting devices in accordance with the respective positions thereof, and means for releasing the operated counting devices after the values indicated thereon have been added by said adding device.

2. In combination with a selecting and releasing mechanism for selecting and dispensing articles of different character from storage, a system for indicating and registering the values of dispensed articles comprising, a plurality of counting devices, each counting device including switching means settable in accordance with said values and counting means connected therewith to count one by one the number of units in any of said values in accordance with the setting of said switching means, said counting being controlled by the selecting mechanism and settable thereby to different positions corresponding to the values of articles selected by the selecting mechanism, and an adding device interconnected with said plurality of counting devices for adding up one after the other the values indicated on the plurality of counting devices, said counting devices being adapted to maintain their set positions until the values have been added by said adding device and once set being again settable by said selecting mechanism only after said values have been added by said adding device.

3. In combination with a selecting and releasing mechanism for selecting and dispensing articles of different character from storage, a system for indicating and registering the values of dispensed articles comprising, an adding device for adding up one after the other the values of articles selected and dispensed by the selecting and dispensing mechanisms, a plurality of counting devices for interconnecting the selecting mechanism and said adding device and adapted to be moved to positions corresponding to the values of articles selected, each counting device including switching means settable in accordance with said values and counting means connected therewith to count one by one the number of units in any of said values in accordance with the setting of said switching means, said counting devices also operating to render said adding device effective upon assuming moved positions corresponding to the values of articles selected, and means effective upon operation of a counting device for connecting the other unoperated counting devices to said selecting mechanism in successive order.

4. In combination with a selecting and releasing mechanism for selecting and dispensing articles of different character from storage, a system for indicating and registering the values of dispensed articles comprising, a plurality of counting devices for each denomination occurring in the value of a single article to be selected, each counting device including switching means settable in accordance with said values and counting means connected therewith to count one by one the number of units in any of said values in accordance with the setting of said switching means, said counting device being controlled by the selecting mechanism to indicate the value of the article selected, an adding device controlled by said plurality of counting devices for adding up one after the other the denominational values indicated on each of said counting devices, means for retaining the counting devices in an operated condition and effective upon operation of one counting device for connecting an unoperated counting device to the selecting mechanism and for preventing further operation of said operated counting devices until after the value indicated thereon has been added by said adding device, and means for restoring each operated counting device to its unoperated condition after the value indicated thereon has been added by said adding device.

5. In combination with a selecting and releasing mechanism for selecting and dispensing articles of different character from storage, a system for indicating and registering the values of dispensed articles comprising, a plurality of storage relay groups controlled by the selecting mechanism, a plurality of rotary switches respectively associated with said plurality of storage relay groups and operable thereby, each one of said storage relay groups including a relay for each denomination occurring in the value of an article to be selected, each one of said rotary switches being interconnected respectively with its associated denominational relay, means for retaining said storage relay groups in an operated condition and for moving said rotary switches to positions corresponding to the storage relay energized, said last-mentioned means also operating when one of said storage relay groups is operated to connect an unoperated storage relay group with the selecting mechanism, an adding device controlled by said plurality of storage relay groups and adapted to add up the values represented by the moved positions of the rotary switches associated with each one of the storage relay groups, and switching means controlled by movement of said rotary switches for releasing each storage relay group and rotary switch after said adding device has added the values represented by the moved positions of the rotary switches.

6. In combination with a selecting and releasing mechanism for selecting and dispensing articles of different character from storage, a system for indicating and registering the values of dispensed articles comprising, a plurality of storage relay groups controlled by the selecting mechanism, a plurality of rotary switches respectively associated with said plurality of storage relay groups and operable thereby, each one of said storage relay groups including a relay for each denomination occurring in the value of an article to be selected, each one of said rotary switches being interconnected respectively with its associated denominational relay, means for retaining said storage relay groups in an operated condition and for initiating the movement of said rotary switches to positions corresponding to the denominational relay energized, an adding device controlled by said plurality of storage relay groups and adapted to add up the values represented by the moved positions of the rotary switches associated with each one of the storage relay groups, switching means in circuit with and controlled by said retaining means and adapted to interrupt the operation of the selecting mechanism when one of the storage relay groups is caused to operate, and signal means controlled by said switching means and operable when all the rotary switches for one denomination have been operated.

7. In combination with a selecting and releasing mechanism for selecting and dispensing articles of different character from storage, a system for indicating and registering the values of dispensed articles comprising, a plurality of storage relay groups controlled by the selecting mechanism, a plurality of rotary switches respectively associated with said plurality of storage relay groups and operable thereby, each one of said storage relay groups including a relay for each denomination occurring in the value of an article to be selected, each one of said rotary switches being interconnected respectively with its associated denominational relay, means for retaining said storage relay groups in an operated condition, further means for moving said rotary switches to positions corresponding to the denominational relay energized and adapted to interrupt the circuits of each unoperated rotary switch until the first operated rotary switch has been moved to its proper position, relay means operated by said retaining means to connect an unoperated storage relay group with the selecting mechanism, an adding device controlled by said plurality of storage relay groups and adapted to add up the values represented by the moved positions of the rotary switches associated with each one of the storage relay groups, and switching means controlled by movement of said rotary switches for releasing each storage relay group and rotary switch after said adding device has added the values represented by the moved positions of the rotary switches, said retaining means including a relay in circuit with the plurality of storage relay groups and adapted to interrupt the circuits of each unoperated rotary switch until the first operated rotary switch has been moved to its proper position.

8. In combination with a selecting and releasing mechanism for selecting and dispensing articles of different character from storage, a plurality of counting devices for each denomination of the value of an article and including a plurality of storage relay groups and a like plurality of rotary switches respectively operable thereby, said plurality of storage relay groups being controlled by the selecting mechanism to advance the rotary switches to positions corresponding to the values of articles selected, a second plurality of rotary switches corresponding respectively to each denomination of the value of an article, relay means interconnecting said first and second pluralities of rotary switches for causing the same to advance simultaneously, the second plurality of rotary switches thereby adding the values of articles selected, and means operative when said first plurality of rotary switches reach said positions corresponding to the values of articles selected for restoring the first plurality of rotary switches to their unoperated positions.

9. In combination with a selecting and releasing mechanism for selecting and dispensing articles of different character from storage, a system for indicating and registering the values of dispensed articles comprising, a plurality of counting devices for each denomination in the value of an article including a plurality of storage relay groups controlled by the selecting mechanism and a like plurality of rotary switches operable by their respective storage relay groups, an adding device controlled by said plurality of rotary switches for adding up the values represented thereon by their respective moved positions, relay means for restoring the rotary switch of an operated counting device to its initial unoperated position, and switching means in circuit with said plurality of rotary switches and effective when the rotary switches are in their initial unoperated positions to initiate the operation of a rotary switch of another counting device of the same denomination in accordance with the operation of another storage relay group.

10. In an article dispensing system, a selecting and releasing mechanism for the selection and dispensing of articles of different character from storage, a plurality of counting devices for each denomination in the value of an article and controlled by said selecting mechanism, an adding device controlled by said plurality of counting devices for adding up one after the other the values of articles represented on the counting devices, said adding device including a plurality of rotary switches corresponding respectively to the denominations in the value of an article, said plurality of rotary switches being adapted to be advanced to different moved positions corresponding to values of articles by the operation of said counting device, and relay means in circuit with said plurality of rotary switches and effective when the rotary switch for one denomination reaches a position corresponding to a value in a higher denomination to store said value of higher denomination and release the rotary switch for the adding of further values in lower denominations, said relay means also serving to transfer said stored value to a rotary switch of said higher denomination after this switch has added up values represented on the counting device for said higher denomination.

11. In an article dispensing system, a selecting and releasing mechanism for the selection and dispensing of articles of different character from storage, a plurality of counting devices for each denomination in the value of an article and controlled by said selecting mechanism, an adding device controlled by said plurality of counting devices for adding up one after the other the values of articles represented on the counting devices, said adding device including a plurality of rotary switches corresponding respectively to the denominations in the value of an article, sadi plurality of rotary switches being adapted to be advanced to different moved positions corresponding to values of articles by the operation of said counting device, and relay means in circuit with said plurality of rotary switches and effective when the rotary switch for one denomination reaches a position corresponding to a value in a higher denomination to store said value of higher denomination and release the rotary switch for the adding of further values in lower denominations, said relay means also serving to transfer said stored value to a rotary switch of said higher denomination after this switch has added up values represented on the counting device for said higher denomination, a second plurality of rotary switches for denominations higher than those occurring in the value of articles to be selected, and switching means for transferring the values represented by the positions of the first plurality of rotary switches to one of the second plurality of rotary switches when such value reaches the denomination of the second plurality of rotary switches.

12. In an article dispensing system, a selecting and releasing mechanism for the selection and dispensing of articles of different character from storage, a plurality of counting devices for each denomination in the value of an article and controlled by said selecting mechanism, an adding device controlled by said plurality of counting devices for adding up one after the other the values of articles represented on the counting devices, said adding device including a plurality of rotary switches corresponding respectively to the denominations in the value of an article, said plurality of rotary switches being adapted to be advanced to different moved positions corresponding to values of articles by the operation of said counting device, and relay means in circuit with said plurality of rotary switches and effective when the rotary switch for one denomination reaches a position corresponding to a value in a higher denomination to store said value of higher denomination and release the rotary switch for the adding of further values in lower denominations, said relay means also serving to transfer said stored value to a rotary switch of said higher denomination after this switch has added up values represented on the counting device for said higher denomination, a lamp indicator in circuit with said plurality of rotary switches of said adding device and with said plurality of counting devices for indicating the progressive value of selected articles belonging to one batch, and switching means operable by said counting devices to interrupt the lamp indicator circuit during the adding operation of said adding device and to reestablish the lamp indicator circuit when said adding device has completed its operation.

13. In an article dispensing system, a selecting and releasing mechanism for the selection and dispensing of articles of different character from storage, and a registering mechanism electrically connected with said selecting mechanism for indicating and registering the values of dispensed articles, said registering arrangement comprising a plurality of counting devices, each one including a storage relay group and a rotary switch in electrical connection therewith and operable thereby, relay means for locking the storage relay groups after operation thereof by said selecting mechanism and for initiating the movement of the rotary switches associated with the operated storage relay groups, an adding device including an additional plurality of rotary switches controlled by said counting devices for adding up the values represented thereon, a lamp indicator in connection with said plurality of rotary switches forming a part of said adding device and with said relay means for indicating the progressive value of selected articles forming a part of one batch, said relay means also serving to render ineffective said lamp indicator while said storage relay groups are in a locked condition, and additional relay means for releasing the locked storage relay groups and rendering effective said lamp indicator after the rotary switches included in said adding device have been moved to positions corresponding to the added up values of articles dispensed.

14. An article dispensing system comprising a selecting and releasing mechanism for the selection and dispensing of articles of different character from storage, and a registering arrangement controlled by said selecting mechanism for indicating and registering the values of articles selected and dispensed, said registering arrangement including a plurality of counting devices controlled by said selecting mechanism for movement to positions corresponding to the value of an article selected, an adding device including a plurality of rotary switches respectively associated with said plurality of counting devices to add up the values of one bath represented on said counting devices, a totalling device controlled by said adding device for totalling the values appearing on the plurality of rotary switches included in the adding device, a registering device operated by said totalling device for recording the total value appearing thereon, and switching means effective after the completion of a batch to initiate the operation of said totalling device thereby to transfer the values represented on the adding device to said registering device, said switching means also serving to restore the adding device to its initial unoperated position after the actuation of the totalling device.

15. An article dispensing system comprising a selecting and releasing mechanism for the selection and dispensing of articles of different character from storage, and a registering arrangement controlled by said selecting mechanism for indicating and registering the values of articles selected and dispensed, said registering arrangement including a plurality of counting devices controlled by said selecting mechanism for movement to positions corresponding to the value of an article selected, an adding device including a plurality of rotary switches respectively associated with said plurality of counting devices to add up the values of one batch represented on said counting devices, a totalling device including a second plurality of rotary switches respectively associated with said plurality of rotary switches included in said adding device and adapted to total the values of dispensed articles represented on the rotary switches included in the adding device, a registering device controlled by said totalling device for registering the total value of articles selected and dispensed in one batch, switching means operable after the completion of one batch for initiating the operation of said totalling device to transfer the values represented on said adding device to said registering device, said switching means also serving to restore the rotary switches of said adding device to their initial unoperated positions after the rotary switches of said totalling device have been restored to their initial unoperated positions, and relay means in circuit with said totalling and registering devices and adapted to interrupt the electrical circuit therebetween and to restore the rotary switches of the totalling device to their initial unoperated positions after the rotary switches of the totalling device have been moved to positions corresponding to positions of the rotary switches of said adding device.

16. An article dispensing system comprising a selecting and releasing mechanism for the selection and dispensing of articles of different character from storage, and a registering arrangement controlled by said selecting mechanism for indicating and registering the values of articles selected and dispensed, said registering arrangement including a plurality of counting devices controlled by said selecting mechanism for movement to positions corresponding to the value of an article selected, an adding device including a plurality of rotary switches respectively associated with said plurality of counting devices and adapted to add up the values of one batch represented on said counting devices, a totalling device including a second plurality of rotary switches respectively associated with the first plurality of rotary switches, said totalling device being controlled by said adding device, a plurality of message registers corresponding respectively to different denominations in the added up values represented on said adding device, said message registers being operated by said totalling device for recording the total value of articles selected and dispensed, each one of said plurality of message registers having contact means in circuit with said second plurality of rotary switches and operable at each step of the message register for controlling the movement of the second plurality of rotary switches.

17. An article dispensing system comprising a selecting and releasing mechanism for the selection and dispensing of article of different character from storage, and a registering arrangement controlled by said selecting mechanism for indicating and registering the values of articles selected and dispensed, said registering arrangement including a plurality of counting devices controlled by said selecting mechanism for movement to positions corresponding to the value of an article selected, an adding device including a plurality of rotary switches respectively associated with said plurality of counting devices and adapted to add up the values of one batch represented on said counting devices, a totalling device including a second plurality of rotary switches respectively associated with the first plurality of rotary switches, said totalling device being controlled by said adding device, a plurality of message registers corresponding to different denominations in values represented on said totalling device, an additional plurality of message registers adapted to be connected to said totalling device thereby to separately record the total values of different batches, switching means controlled by said selecting mechanism to connect any one of said additional plurality of message registers to said totalling device, each message register and each additional message register including contact means in circuit with a plurality of rotary switches on said totalling device and effective upon each advance of a corresponding message register to control the operation of said totalling device in accordance with the combined operation of the contact means associated with each message register and each additional message register.

18. In an article dispensing system, a selecting and releasing mechanism for the selection and dispensing of articles of different character from storage, and a plurality of registering devices controlled by said selecting mechanism for indicating and registering simultaneously the total value of articles selected, each registering device including a plurality of counting devices, each counting device including switching means settable in accordance with said values and counting means connected therewith to count one by one the number of units in any of said values in accordance with the setting of said switching means, said counting devices being controlled by said selecting mechanism and adapted to be operated thereby into moved positions corresponding to the values of articles selected, switching means effective as one of said plurality of counting devices is operated to maintain the same in its operated condition and to connect an unoperated counting device to the selecting mechanism to be next operated thereby, an adding device controlled by said plurality of counting devices for adding up one after the other the values represented on said counting devices, and relay means for releasing each operated counting device after the value represented thereon has been transferred to said adding device.

PETER LINCOLN LAW.

REFERENCES CITED

The following references are of record in the file of this patent:

UNITED STATES PATENTS

| Number | Name | Date |
| --- | --- | --- |
| 2,164,956 | Smith | July 4, 1939 |
| 2,167,513 | Johnston | July 25, 1939 |
| 2,258,290 | Johnstone et al. | Oct. 7, 1941 |
| 2,345,212 | Nelson | Mar. 28, 1944 |
| 2,490,362 | Lake et al. | Dec. 6, 1949 |
| 2,528,394 | Sharpless et al. | Oct. 31, 1950 |